(12) United States Patent
Song et al.

(10) Patent No.: US 8,037,909 B2
(45) Date of Patent: Oct. 18, 2011

(54) PNEUMATIC RADIAL TIRE WITH WATER-SPLASH CONTROL RIB

(75) Inventors: Kang-Jong Song, Jeollanam-do (KR); Sung-Wan Park, Gwangju-si (KR); Kang Byeon, Gwangju-si (KR)

(73) Assignee: Kumho Tire Co., Inc. (KP)

( * ) Notice: Subject to any disclaimer, the term of this patent is extended or adjusted under 35 U.S.C. 154(b) by 802 days.

(21) Appl. No.: 11/930,525

(22) Filed: Oct. 31, 2007

(65) Prior Publication Data
US 2008/0110543 A1    May 15, 2008

(30) Foreign Application Priority Data

Oct. 31, 2006  (KR) .................. 10-2006-0106673
Apr. 11, 2007  (KR) .................. 10-2007-0035403
Oct. 25, 2007  (KR) .................. 10-2007-0107985

(51) Int. Cl.
    *B60C 13/02*    (2006.01)
(52) U.S. Cl. ............ 152/154; 152/209.16; 152/523
(58) Field of Classification Search ............ 152/154, 152/523, 209.16
See application file for complete search history.

(56) References Cited

U.S. PATENT DOCUMENTS

| | | | | |
|---|---|---|---|---|
| 2,477,754 A * | 8/1949 | Kraft | ......................... | 152/523 X |
| 3,811,488 A * | 5/1974 | Duncan | ..................... | 152/523 X |
| 3,825,052 A * | 7/1974 | Matsuyama et al. | ...... | 152/523 X |
| 4,124,052 A * | 11/1978 | Beauchamp | .............. | 152/523 X |
| 4,341,249 A * | 7/1982 | Welter | ...................... | 152/523 X |
| 4,356,985 A | 11/1982 | Yeager et al. | | |
| 4,926,918 A * | 5/1990 | Demor et al. | ................. | 152/154 |
| 4,993,466 A * | 2/1991 | Ochiai | ...................... | 152/523 X |
| 6,330,896 B1 * | 12/2001 | Nakasai et al. | .............. | 152/523 |
| 6,460,584 B1 | 10/2002 | de Labareyre | | |
| 6,843,291 B1 * | 1/2005 | Gaudin | ..................... | 152/523 X |
| 2009/0032161 A1 * | 2/2009 | Yamaguchi | .................. | 152/523 |

FOREIGN PATENT DOCUMENTS

| | | | |
|---|---|---|---|
| EP | 0 072 500 A2 * | 2/1983 | |
| FR | 2.214.602 A * | 9/1974 | |

* cited by examiner

*Primary Examiner* — Adrienne C Johnstone
(74) *Attorney, Agent, or Firm* — McDonnell Boehnen Hulbert & Berghoff LLP

(57) ABSTRACT

Pneumatic radial tires are described having belt layers deposited under a tread and a ring-shaped water-splash control rib (100) formed on the sidewall (20), wherein the upper profile Lb of the rib is positioned above a continuation line (Ca) which extends along an average profile of an outmost belt layer and which is divided in to upper and lower profile of the outmost belt layer, the rib comprising drainage grooves or drainage protuberances in the upper profile of the rib, the height h of the rib is 0.085-0.115 times the width TW of the tread ($0.085TW \leq h \leq 0.115TW$).

13 Claims, 15 Drawing Sheets

PNEUMATIC RADIAL TIRE WITH WATER-SPLASH CONTROL RIB

BACKGROUND OF THE INVENTION

The present invention relates to a pneumatic radial tire with water-splash control capability, and more particularly, to a pneumatic radial tire with a water-splash control rib wherein by optimizing the profile of the ring-shaped water-splash control rib on the sidewall along the circumference of the tire, water-splash control and heat radiation increase, improving the durability of the tire.

According to the present invention, when a heavy load vehicle, such as a truck or a bus, drives on a road covered with water puddles or with foreign substances, such as stones, the water and the foreign substances will not splash or bounce-off to strike the surrounding vehicles, thus improving driver visibility, and pedestrians will be free from getting splashed by water or hit by foreign substances.

Moreover, the water-splash control can last for a long time and can prevent loss of durability with good heat radiation performance, and therefore, can improve safety when driving on the present pneumatic radial tires with water-splash control rib.

The present invention is keyed to heavy duty pneumatic radial tires, but it can also be applicable to tires on passenger vehicles, SUVs, and light-weight trucks.

DESCRIPTION OF THE RELATED ART

When a vehicle drives over a puddle of water, the tire will compress the water on the road, causing a water-splash.

At this moment, water splashed underneath the vehicle will disperse, however, water splashed toward the surroundings can endanger the safety of other vehicles by reducing driver visibility.

FIG. 1 represents a configuration of a "water-splash control tire" by the Goodyear Tire & Rubber Company in U.S. Pat. No. 4,356,985, that suggests increased safety by decreasing water-splash accidents.

As the figure shows, the water-splash control tire's basic technical configuration comprises a sidewall that is installed with a protuberance that is uniform in height, ring-shaped, and extends about the circumference of the tire.

According to Goodyear's water-splash control tire, which has a water-splash control ring-shaped protuberance (Z) (also known as "water-splash control ring") positioned on the sidewall nearest to the tread or shoulder of a tire, even if the tread compresses water on the road so that it bounces off both sides of the tire, the water will be blocked by the protuberance (Z) formed along the sidewall. Therefore, the Goodyear tire can prevent or decrease water-splashes.

As a result, for a heavy load vehicle driving on a heavy duty tire drives over a puddle of water on the Goodyear tire, the water will not splash on a surrounding vehicle's windshield, thus creating a safer driving condition.

However, because the Goodyear "water-splash control tire" has a ring-shaped protuberance formed along the sidewall, the sidewall can be thick resulting in the end of the belt layer being damaged by heat.

In other words, if the water-splash control tire's sidewall comprises a ring-shaped protuberance (Z), the amount of rubber in a specific area increases, therefore, the outmost part of the belt layer will interrupt the heat radiation of the tire when driving. As a result, the end parts of the belt layers will overheat, causing the end parts of the belts to separate, and ultimately, decreasing the durability of the tire and creating a hazardous driving condition on the road.

In order to fix the decrease in heat radiation in the water-splash control tire, Michelin, in U.S. Pat. No. 6,460,584, and France Pat. No. 2792877, optimized a water-splash control ring's profile for improved 'water-splash control' and 'heat radiation' in a heavy duty tire.

For example, Michelin suggested in their invention that in order to efficiently overcome the heat generated by the tread area, and to effectively release heat from both ends of the belt layers, at least a part of the upper profile of the ring-shaped protuberance has to be positioned below the average profile of the outmost belt.

Nevertheless, when this type of heavy duty water-splash control tire contacts an uneven surface or when a heavy weight is applied to the tire, the ring-shaped protuberance contacts the road surface. Because of an outside pressure applied from the road surface toward the upper profile of the protuberance, the end of the protuberance can crack or the protuberance can wear, shortening the life of the water-splash control tire.

In particular, a part of the protuberance can come apart due to a crack in the recessive part, rather than other parts, of the upper profile of the protuberance. This is due to the direction of the outside pressure applied to the protuberance, consistent with the progression of the crack. Therefore, if a part of the ring-shaped protuberance comes apart, the capacity of the water-splash control is no longer available.

OBJECTIVE OF THE INVENTION

The object of the present invention is to overcome the problems of the prior art described above by optimizing the profile of the ring-shaped water-splash control rib on the sidewall of the tire, to improve the water-splash control, heat radiation, and the durability of the tire.

EXPLANATION OF THE MARKS IN THE FIGURES

Figure 1:
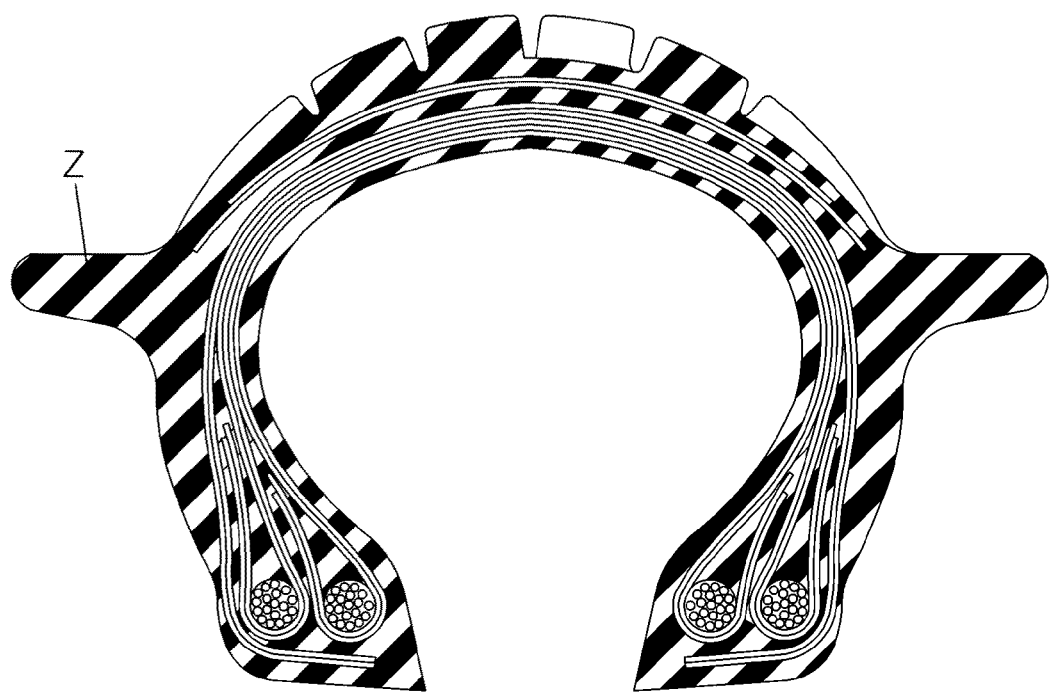
FIG. 1 is a cross-sectional view of a conventional tire with water-splash control.

1: Tire.
12: Belt Layer.
20: Sidewall.
100: Ring-shaped rib.
110, 110': Drainage groove or Drainage protuberance.
120: Drainage channel along the circumference of the tire.
CC: Body ply.
1B: #1 Belt.
2B: #2 Belt.
3B: #3 Belt.
4B: #4 Belt.
CL: Center line of the cross-section of the tire or the vertical axis of the tire.
TD: Tread of the tire.
Gv: Groove of the tire.
SH: Maximum height of the tire from the horizontal axis of the tire.
SW: Maximum width of the tire from the vertical axis of the tire.
TW: Width of the tread of the tire.
A: Interior angle between the tangent line that passes through the endpoint of the tread and contacts the upper profile of the ring-shaped rib, and the continued horizontal line that horizontally passes through the endpoint of the tread.
B: Interior angle between the lateral profile of the tread and the continued vertical line that vertically passes through the endpoint of the tread.
C: Interior angle between the tangent line that passes through the endpoint of the tread and contacts the lateral profile of the sidewall, and the vertical line that vertically passes through the endpoint of the tread.
D: Interior angle between the tangent line that passes through the endpoint of the tread and contacts the lateral profile of the sidewall, and the horizontal line that horizontally passes through the endpoint of the tread.
E: Farthest point of the sidewall from the center line when pressure and weight is applied to the tire.
F: Farthest point of the ring-shaped rib from the center line when pressure and weight is applied to the tire.
0: Basis point.
Ca: Continuation line that connects the average profile of the outmost belt.
Cb, Cc: Parallel curved line that is different in gap from the continuation curved line which connects the bottom of the groove of the tire.
Cd: Lateral profile of the sidewall.
CS: Continuation line that connects an arbitrary point on the sidewall and the center of rotation of the tire.
D1: Distance between the continuation line from the bottom of the groove of the tire and the parallel curved line Cc.
D2: Distance between the continuation line from the bottom of the groove of the tire and the parallel curved line Cb.
Dp: Height from starting point of the lower profile of the ring-shaped rib to the horizontal axis of the tire.
HL: Horizontal axis of the tire or a straight line that passes through the bottom of the bead among the straight lines that move parallel from the rotation axis of the tire.
La: Lateral profile of the tread.
Lb: Upper profile of the ring-shaped rib.
Lc: Vertical line that continues from the endpoint of the tread.
Le: Tangent line that passes through the endpoint of the tread and contacts the upper profile of the ring-shaped rib.
Ld: Tangent line that passes through the endpoint of the tread and contacts the lateral profile of the sidewall.
Pa: Endpoint of the lateral profile of the tread or the endpoint of the tread.
Pb: Intersecting point of the parallel curved line Cc and the continuation line of the lateral profile of the tread.
Pc: Intersecting point of the tangent line that passes through the endpoint of the tread and contacts the upper profile of the ring-shaped rib, and the horizontal curved line Cb.
Pe: Starting point of the lower profile of the ring-shaped rib.
Ra: Radius of the section of the curved line from the lateral profile of the tread to the upper profile of the ring-shaped rib in order to make the section smoother.
Rb: Radius of the curved line of the free end of the ring-shaped rib.
Rc: Radius of the recessive section which includes the starting point of the lower profile of the ring-shaped rib.
Rd: Radius of the imaginary circle such that the tangent of the circle contacts the upper profile of the ring-shaped rib that passes through the endpoint of the tread.
Re: Radius of the imaginary circle that has the perpendicular line coming from the tangent line (Le) that provides interior angle (A) starting at the lower profile of the ring-shaped rib as its diameter.
d: Angle between the drainage grooves or the drainage protuberances.
h: Distance between the intersecting point of the upper profile of the ring-shaped rib and lateral profile of the sidewall to the farthest point of the ring-shaped rib from the center line.
t: Length of the drainage groove or the drainage protuberance.

Preferred features of the present pneumatic radial tire with a water-splash control rib are the belt layer deposited under the tread and the ring-shaped water-splash control rib (100) formed on the sidewall. The upper profile of the rib is positioned above the continuation line which extends the average profile of the outmost layer of belt which is divided in to upper and lower profile.

In this case, a preferred embodiment is to have the distance between the center line of the tire to the farthest point of the ring-shaped rib greater than the distance between the center line of the tire to the farthest point of the sidewall.

Moreover, to achieve the object as stated above, a preferred rib design is to satisfy the following condition between the two angles; an interior angle (A), which is an angle between the tangent line that passes through the endpoint of the tread and contacts the upper profile of the rib, and the continued horizontal line that horizontally passes through the endpoint of the tread, and an interior angle (D), which is an angle between the tangent line that passes through the endpoint of the tread and contacts the lateral profile of the sidewall, and the horizontal line that horizontally passes through the endpoint of the tread:

$$47° \leq A \leq D.$$

A preferred embodiment for forming the rib is to satisfy the following condition between the height (SH), which is the maximum height of the tire from the horizontal axis of the tire, the basis point (0), and the height (Dp), which is the height from starting point of the lower profile of the rib to the horizontal axis of the tire:

$$0.74\text{SH} \leq \text{Dp} \leq 0.78\text{SH}.$$

A preferred embodiment for forming the rib is to satisfy the following condition between two angles; an interior angle (C), which is the angle between the tangent line that passes through the endpoint of the tread and contacts the lateral profile of the sidewall, and the vertical line that vertically passes through the endpoint of the tread, and an interior angle (B), which is the angle between the lateral profile of the tread and the continued vertical line that vertically passes through the endpoint of the tread:

$$0° \leq \text{B} \leq \text{C}.$$

A preferred embodiment for forming the rib is to have a recessive circular arc in the radius (Rc), which is the radius of the recessive section which includes the starting point of the lower profile of the ring-shaped rib, of the uniform length in the starting point of the lower profile among the entire lower profile of the ring-shaped rib.

A preferred embodiment for forming the rib is to satisfy the following condition between the radius (Ra), which is the radius of the section of the curved line from the lateral profile of the tread to the upper profile of the rib in order to make the section smoother, the radius (Rd), which is the radius of the imaginary circle such that the tangent of the circle contacts the upper profile of the rib that passes through the endpoint of the tread, the radius (Rc), which is the radius of the recessive section which includes the starting point of the lower profile of the ring-shaped rib, the radius (Re), which is the radius of the imaginary circle that has the perpendicular line coming from the tangent line (Le) that provides interior angle (A) starting at the lower profile of the ring-shaped rib as its diameter:

$$2 \text{ mm} \leq \text{Ra} \leq \text{Rd},$$

$$3 \text{ mm} \leq \text{Rc} \leq \text{Re}.$$

Moreover, a preferred embodiment is to have more drainage grooves or more drainage protuberances on the rib surface. The drainage grooves or the drainage protuberances are to be in uniform range according to the rib, for example, the range will be 0.5°-5° along the direction of the circumference of the tire from the continuation line (CS) connecting the center of the endpoint of the sidewall and the center of the sidewall.

Furthermore, when forming the drainage grooves or the drainage protuberances on the surface of the upper profile of the rib, it is preferred that the drainage grooves or the drainage protuberances to have an S-shape or an X-shape, resulting in a better drainage of the tire while driving on a wet road.

When forming the drainage protuberance on the rib surface, it is preferred that the height of the protuberance is between 1 mm and 6 mm, and in the case of the drainage groove, the depth should be between 1 mm and 6 mm.

Also, it is preferred that the rib height (h) is 0.085-0.115 times (0.085TW≦h≦0.115TW) the width of the tread (TW).

Moreover, there can be more than one drainage groove that goes along the circumference of the tire inside the upper profile of the rib.

Further, the formation of the rib, if viewing in the direction of looking down the tread, can be configured such that the plane of the free end, including the outmost point of the rib, along the circumference of the tire forms a sine wave.

As described above, through the configuration of the water-splash control rib, when a heavy load vehicle drives through a puddle of water, there is a possibility that the water will splash onto vehicles going in the same direction or coming from the opposite direction, thus creating a hazard for drivers and pedestrians. With the pneumatic radial tire with water-splash control rib, the hazardous condition can be prevented.

Moreover, by optimizing the rib position and shape, it is possible to prevent accidents caused by belt separation and sidewall cracks of conventional water-splash control tires. Further, by optimizing the rib profile, the weight increase from installation of a water-splash control ring-shaped rib is also minimized.

DETAILED DESCRIPTION OF THE PREFERRED EMBODIMENTS

The present invention relates to a pneumatic radial tire, and more particularly, to a pneumatic radial tire with a water-splash control rib, wherein by optimizing the profile of the ring-shaped water-splash control rib on the sidewall along the circumference of the tire, increases water-splash control, heat radiation, and tire durability.

A preferred aspect of the present pneumatic radial tire with water-splash control rib is that the belt layer deposited under the tread and a ring-shaped water-splash control rib (100) formed on the sidewall, wherein the upper profile of the rib is positioned above the continuation line (Ca) which extends the average profile of the outmost belt layer which is divided in to upper and lower profile.

With such a structure, the present invention will increase the rigidity of the rib; decrease the size and the weight of the rib without lowering the efficiency of the water-splash control; and will prevent loss of heat radiation and loss of durability while improving driving safety as compared to conventional water-splash control tires.

The invention will be better understood with reference to the variant embodiments using the drawings, in which the configuration, process, and effectiveness will be described for the pneumatic radial tire with water-splash control.

Here, embodiments 1 through 4 use four belt layers keyed for heavy duty tires, but it can also be applied to passenger vehicle tires (PC) where two belt layers are used.

Embodiment 1

Figure 2:
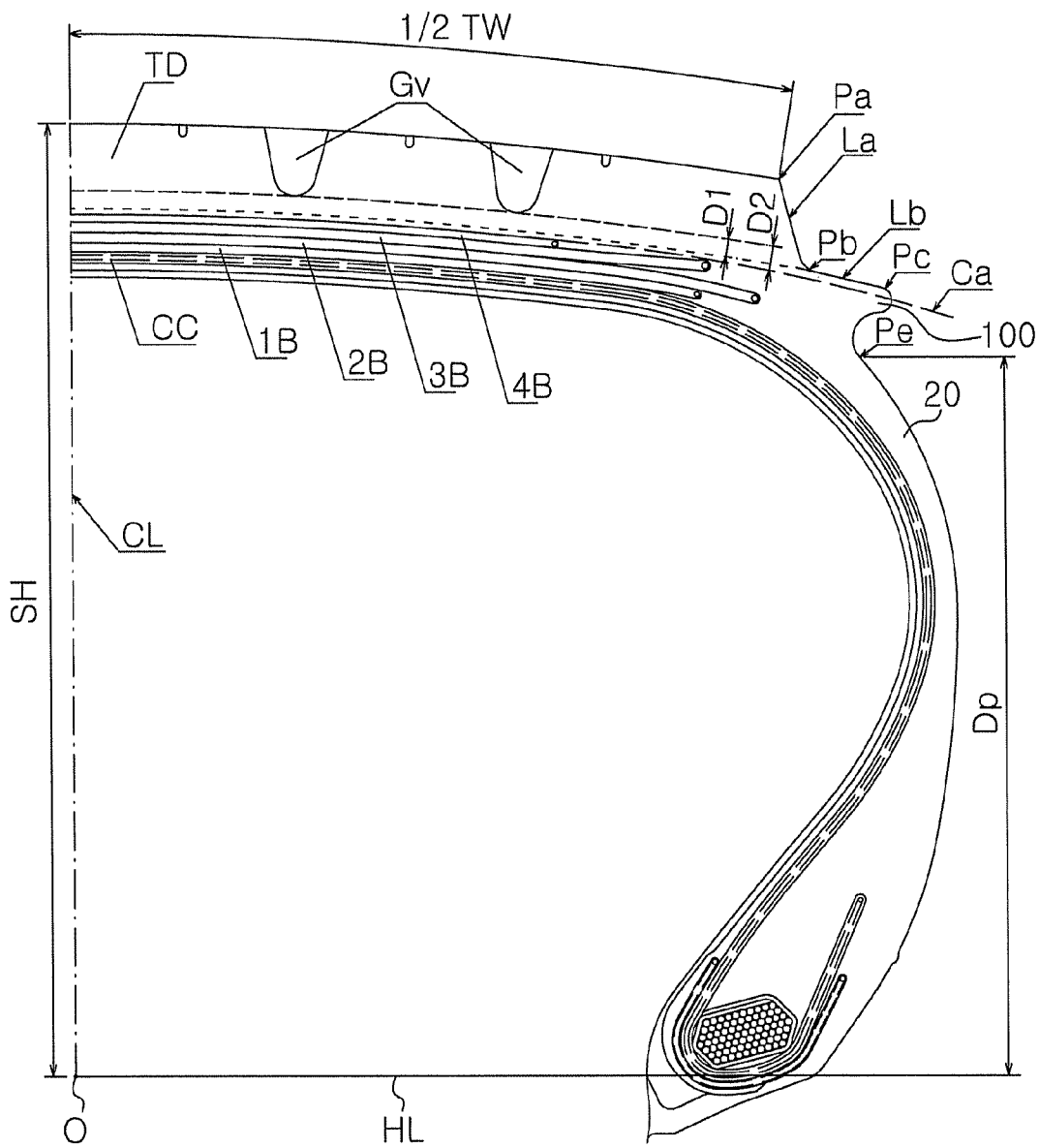
FIG. 2 is a summary cross-sectional view of an example of the present invention of the pneumatic radial tire with water-splash control.
Figure 3:
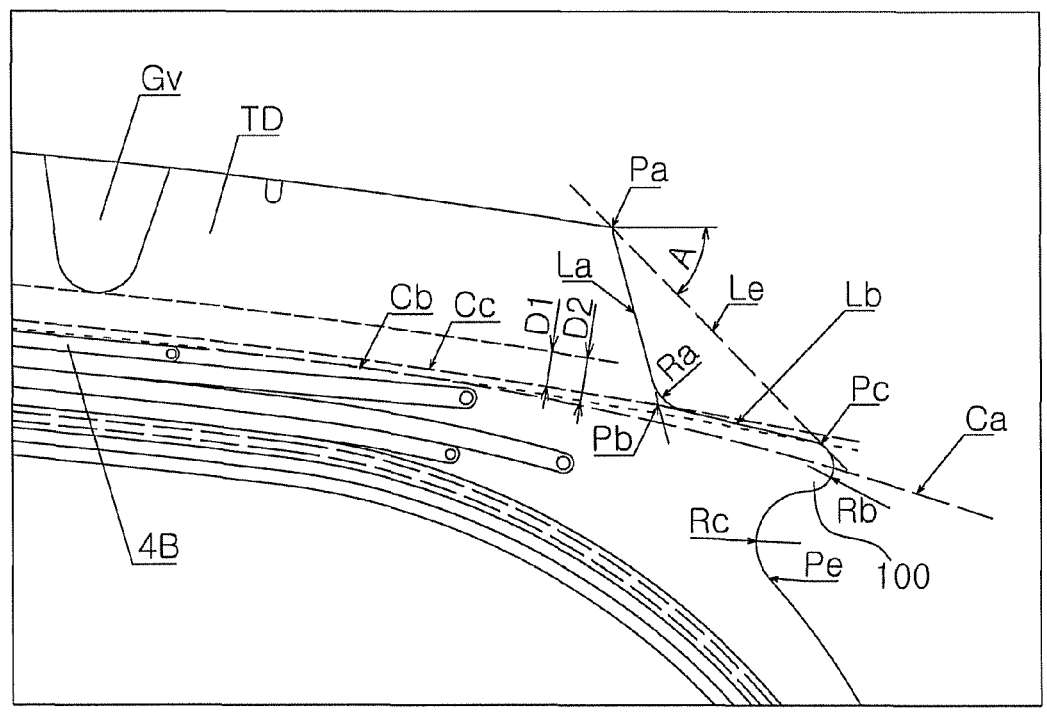
FIG. 3 is a partial enlarged view of FIG. 2.

FIG. 2 and FIG. 3 show that the present embodiment has a center line (CL) through the tire and forms symmetry. Under the tread (TD), which comes in contact with the surface of the road, is the body ply (CC) and four belts (1B, 2B, 3B, 4B).

Along the sidewall (20), there is a water-splash control ring-shaped rib (100) installed, optimized for cross-section profile. The upper profile of the rib is positioned above the continuation line which extends the average profile of the outmost belt (4B), and the details follow.

FIG. 3 illustrates that assuming that there are two horizontal curved line (Cc, Cb) horizontally moved by short distance (D1, D2) from the continuation curved line starting at the bottom of the tire groove, intersection (Pb) is formed by intersecting with short horizontal curved line (Cc) due to relatively short distanced (D1) and lateral profile (La) of the tread (TD). Moreover, horizontally moved (D2) horizontal curved line (Cb), which is relatively long, intersects with intersection (Pc) which passes through the endpoint (Pa) of the lateral profile (La) of the tread forms a horizontal line (Le) that creates an interior angle (A).

The line connecting the intersections (Pb, Pc) becomes the upper profile (Lb) of the rib (100), and according to the present invention, the upper profile of the rib is always positioned above the average continuation curved line (Ca) which extends to the profile of the outmost belt (4B) of the tread (TD).

In this embodiment, D1 was 5 mm and D2 was 6 mm.

Figure 5:
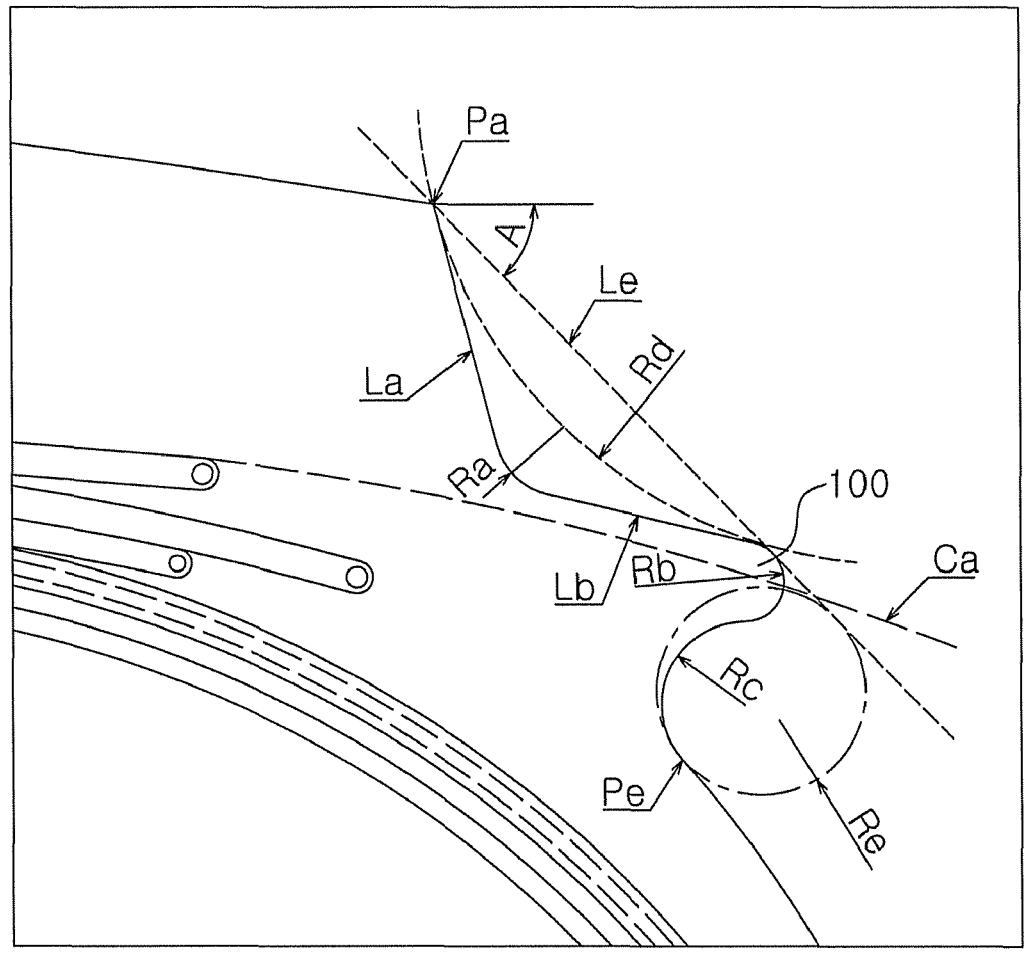
FIG. 5 is a partial enlarged view of FIG. 2.

The rib position in the present invention is defined as follows. For example, FIG. 2 or FIG. 5 shows that the starting point of the lower profile (Pe) of the rib (100) positioned in the lateral profile (Cd) of the sidewall must satisfy the condition which provides for the height (HL) from the starting point to the horizontal axis (HL) of the tire and the highest height (SH): $0.74SH \leq Dp \leq 0.78SH$ The tire's height (SH) is defined as the maximum height of the tire from the horizontal axis of the tire.

If the height (Dp) between the starting point (Pe) and horizontal axis (HL) is less than 0.74SH, the rib's cross-section will unnecessarily increase and thus will increase the weight of the tire and decrease the heat radiation of the tire, and lower the shock absorption of the sidewall and as a result, yielding an uncomfortable ride. On the other hand, if the height (Dp) is higher than 0.78SH, the thickness of the rib (100) will become thinner resulting in a lower strength of the rib, causing the water-splash control not to function properly.

The lateral profile (La) of the tread, which is positioned above the upper profile of the rib (100), is defined as follows.

Figure 4:
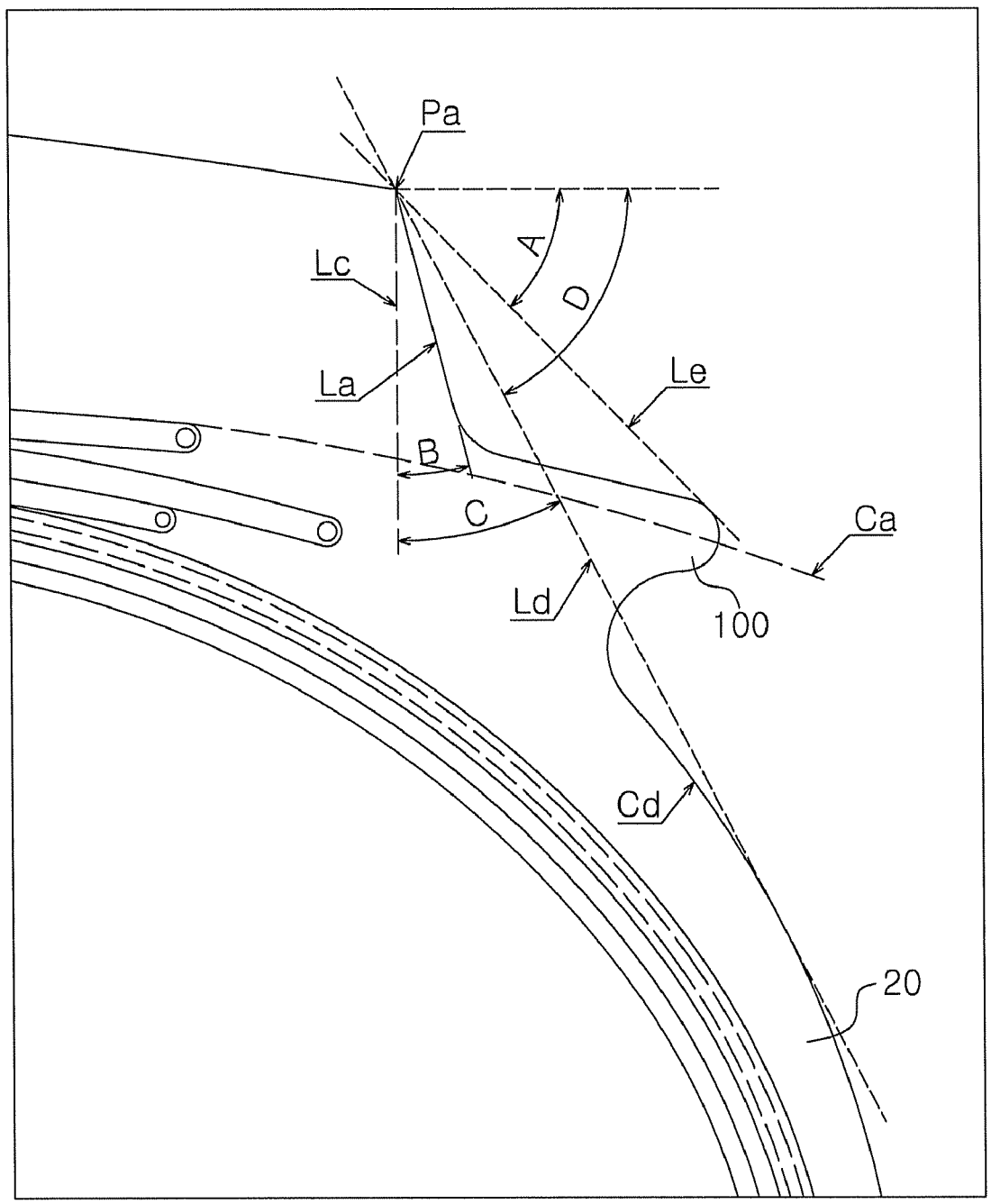
FIG. 4 is a partial enlarged view of FIG. 2.

FIG. 4 shows that an interior angle (B), which is an angle between the lateral profile of the tread and the continued vertical line that vertically passes through the endpoint of the tread must be smaller than an interior angle (C), which is an angle between the tangent line (Ld) that passes through the endpoint (Pa) of the tread and contacts the lateral profile (Cd) of the sidewall, and the vertical line (Lc) that vertically passes through the endpoint of the tread. If shown as a formula, it will look like this:

$$0° \leq B \leq C$$

If the interior angle (B) becomes less than 0, the tread's lateral strength will decrease, and if the interior angle (B) is greater than the interior angle (C), the heat created at the end of the belt upon driving cannot be effectively radiated.

As shown in FIG. 3 and FIG. 4, the rib (100) of the current embodiment must maintain a condition where an interior angle (A), which is an angle between the tangent line (Le) that passes through the endpoint (Pa) of the tread and contacts the upper profile (Lb) of the ring-shaped rib, and the continued horizontal line that horizontally passes through the endpoint (Pa) of the tread, and an interior angle (D), which is an angle between the tangent line (Ld) that passes through the endpoint (Pa) of the tread and contacts the lateral profile (Cd) of the sidewall, and the horizontal line that horizontally passes through the endpoint of the tread:

$$47° \leq A \leq D$$

If the interior angle (A) is less than 47°, the rib height will be too large, thus the heat created at the belt ends will not be effectively radiated, especially, the heat created by the second belt (2B) and the third belt (3B). However, if the interior angle (A) is greater than the interior angle (D) so that the rib height is too small, the water-splash control capacity will diminish, making the tire same as with the conventional tire.

As shown in FIG. 3 and FIG. 5, by defining the profile of the rib (100), the following conditions must be satisfied for the radius (Ra), which is the radius of the section of the curved line from the lateral profile of the tread to the upper profile of the rib in order to make the section smoother, the radius (Rd), which is the radius of the imaginary circle such that the tangent of the circle contacts the upper profile of the rib that passes through the endpoint of the tread, the radius (Rc), which is the radius of the recessive section which includes the starting point of the lower profile of the rib, the radius (Re), which is the radius of the imaginary circle that has the perpendicular line coming from the tangent line (Le) that provides interior angle (A) starting at the lower profile of the rib as its diameter:

$$2\ mm \leq Ra \leq Rd,$$

$$3\ mm \leq Rc \leq Re$$

If the radius (Ra) is less than 2 mm, a crack may be caused due to the concentration of repeated expansion while driving. However, if the radius (Ra) is larger than the radius (Rd), the width of the shoulder part will get thicker, causing inefficient heat radiation at the belt end during driving and causing separation, leading to decrease in tire durability.

Moreover, if the radius (Rc) is less than 3 mm, there is a possibility of a crack due to the repeated expansion of the sidewall while driving. On the other hand, if the diameter (Rc) is larger than radius (Re), the width of the rib will become thinner, decreasing rib stiffness and causing ineffective water-splash control.

Figure 15:
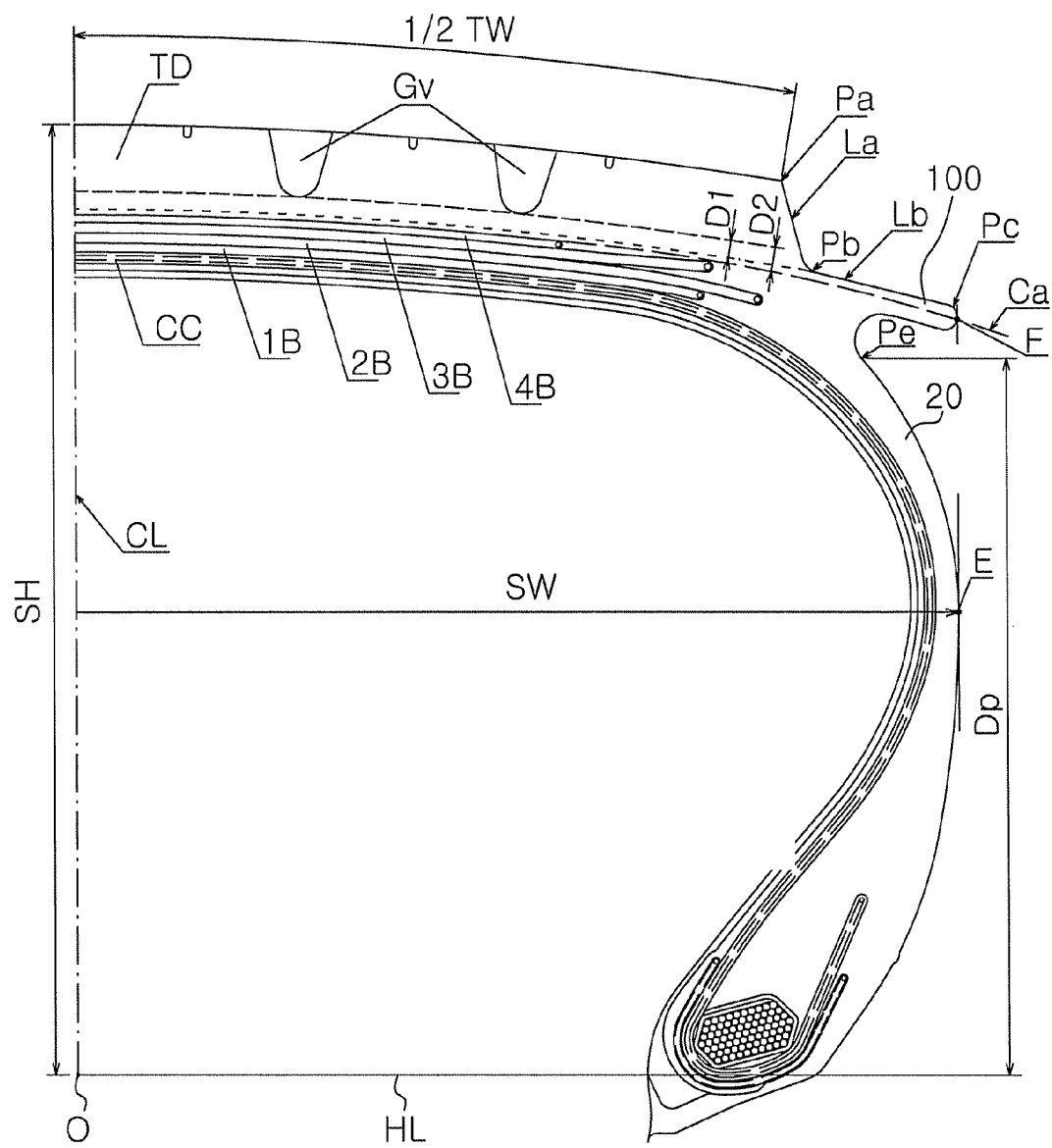
FIG. 15 is a cross-sectional confrontation view of FIG. 2.

In order to connect the upper profile (Lb) of the rib with the lower profile of the rib by a smooth curved line, it is preferred that the free end of the rib is a form of an arc having a small radius (Rb). Here, the free end of the rib includes the point (F), which is the farthest point of the rib from the center line, such that it is always protrudes more than the point (E), which is the farthest point of the sidewall (20) from the center line. In other words, as shown in FIG. 15, the distance between the point (E) of the sidewall and the center line (CL) of the tire is smaller than the point (F) of the above rib and the center line (CL) of the tire.

In this configuration, it is possible to decrease splashing caused when water is compressed between the surface of the road and the tread.

Embodiment 2

Figure 6:
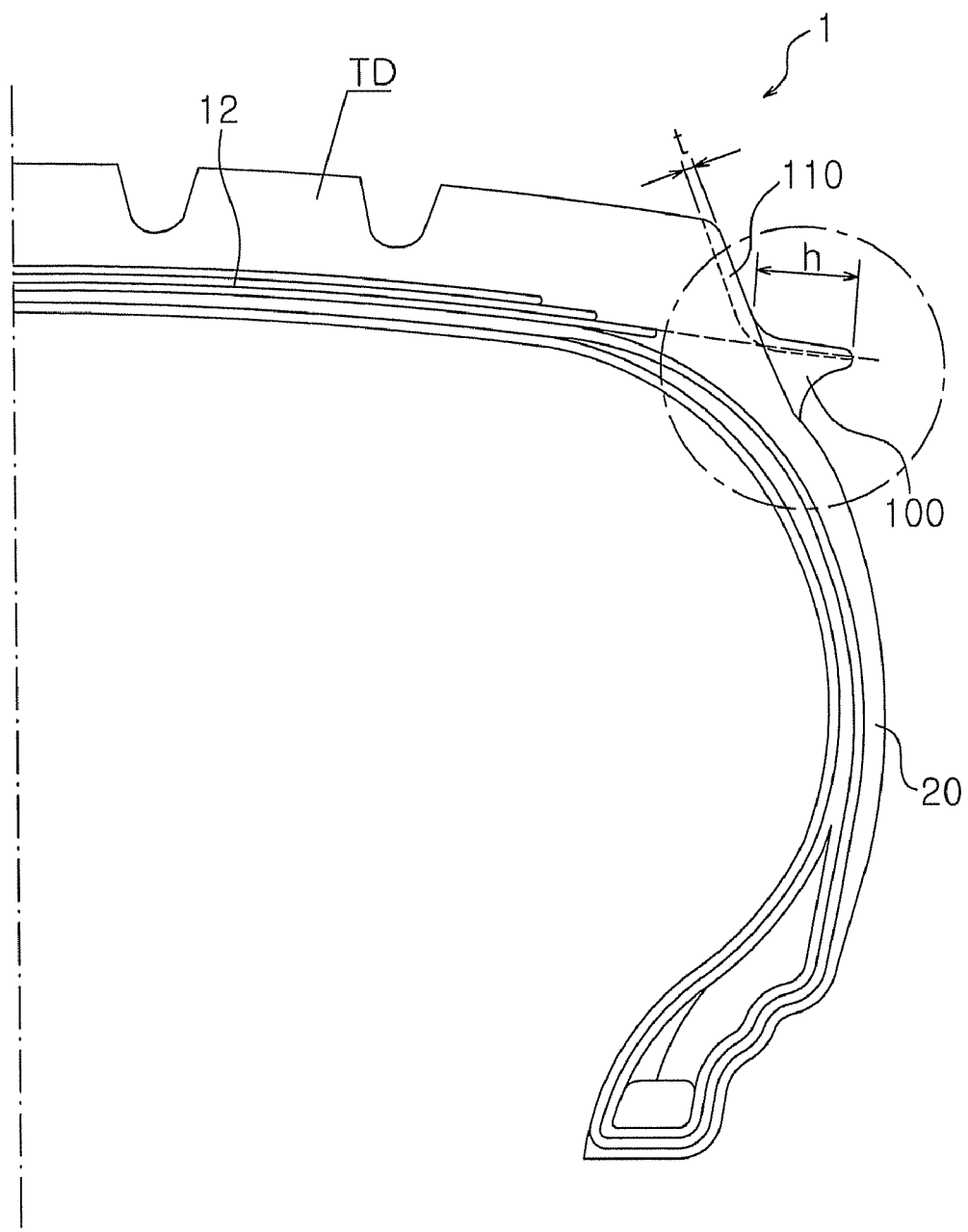
FIG. 6 is a cross-sectional view of another example of the present invention of the pneumatic radial tire with water-splash control.
Figure 7:
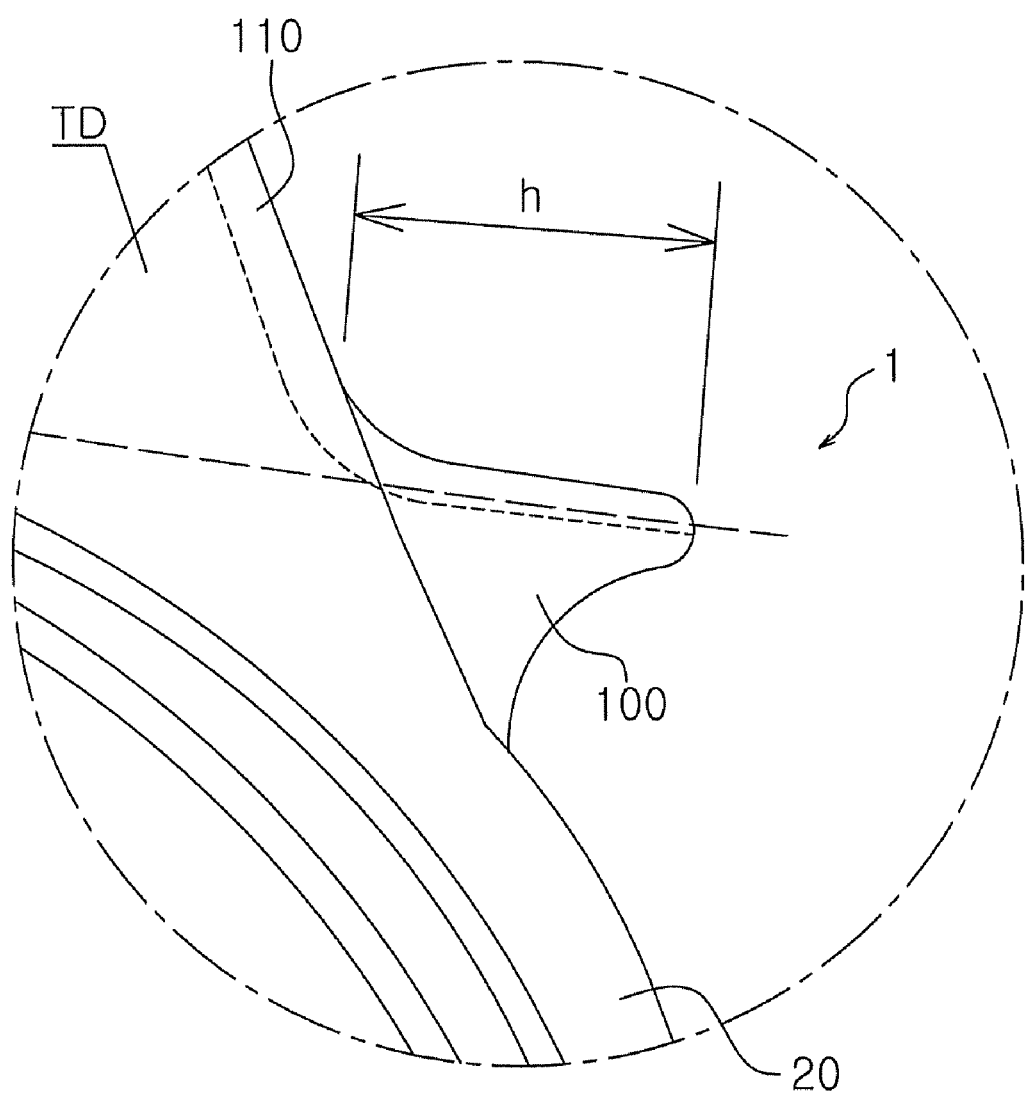
FIG. 7 is a partial enlarged view of FIG. 6.
Figure 8:
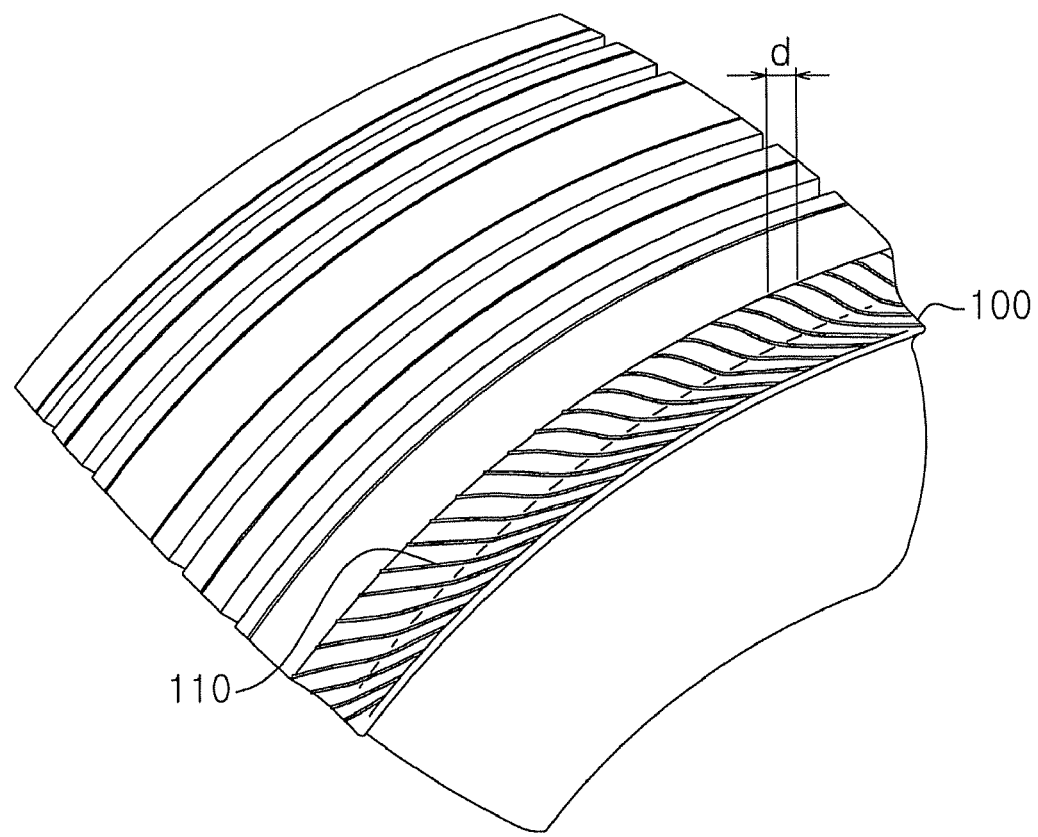
FIG. 8 is a partial solid view of the pneumatic radial tire with water-splash control shown in FIG. 6.
Figure 9:
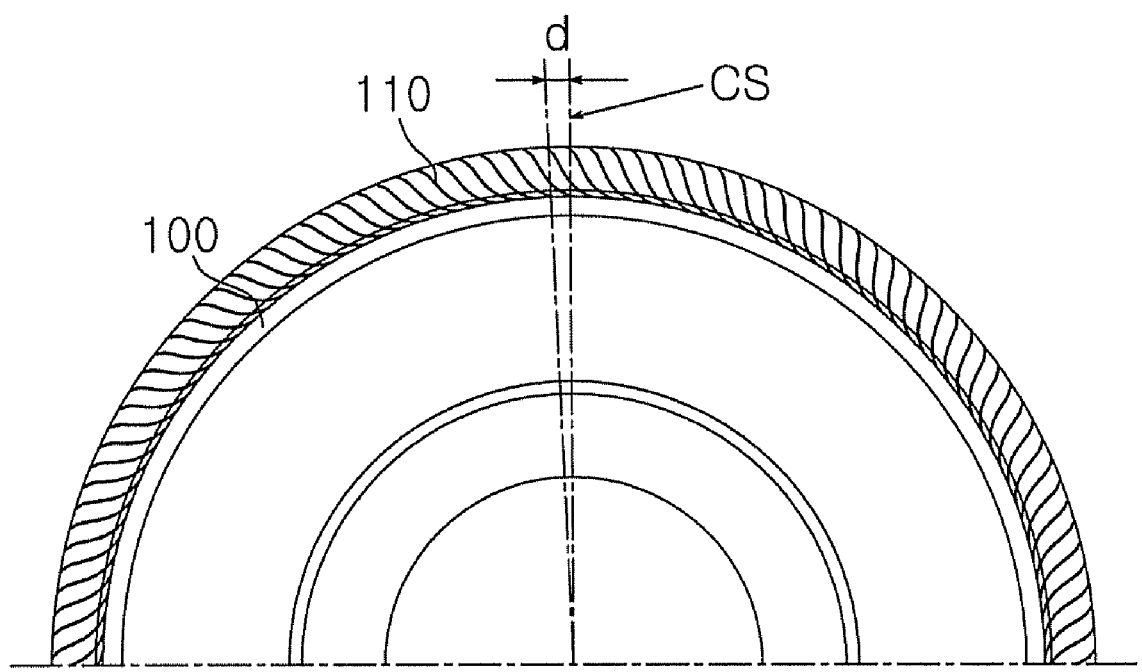
FIG. 9 is a lateral view of the pneumatic radial tire with water-splash control shown in FIG. 6.
Figure 10:
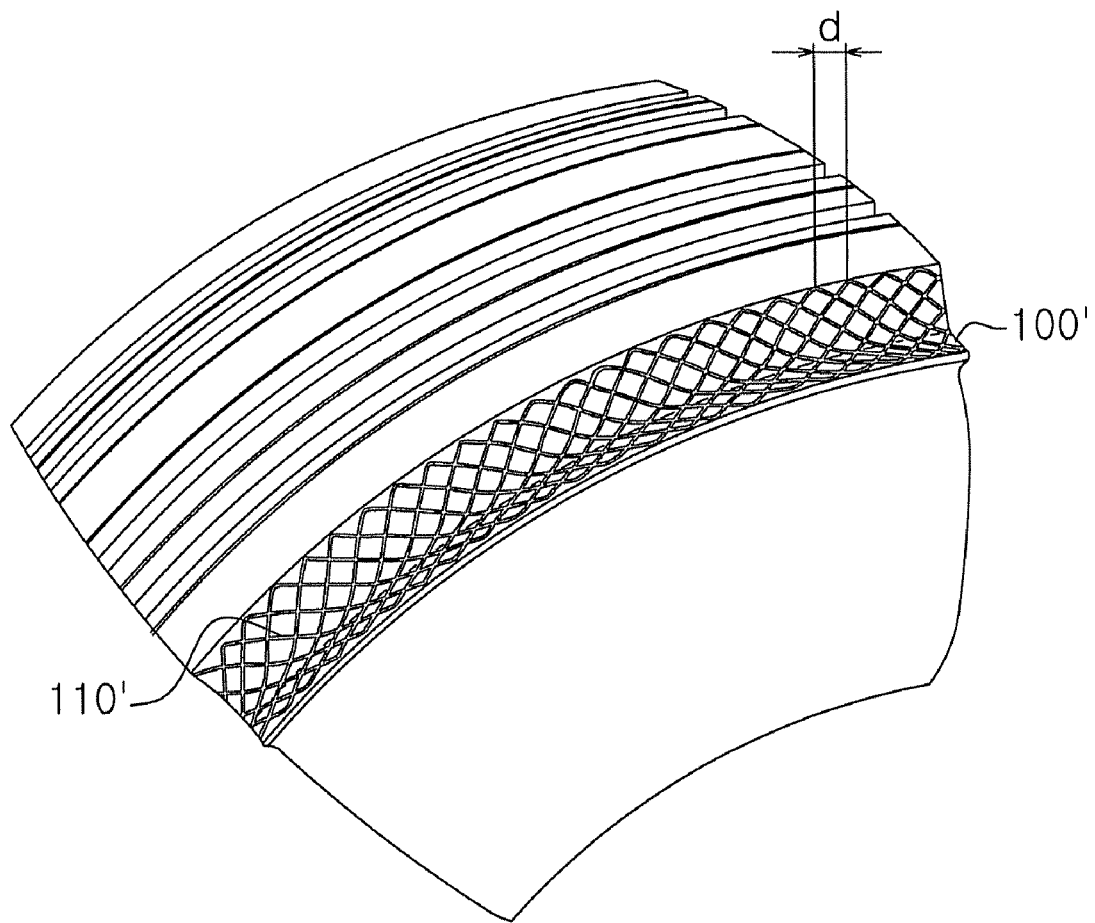
FIG. 10 is a solid view of another example of the pneumatic radial tire with water-splash control.
Figure 11:
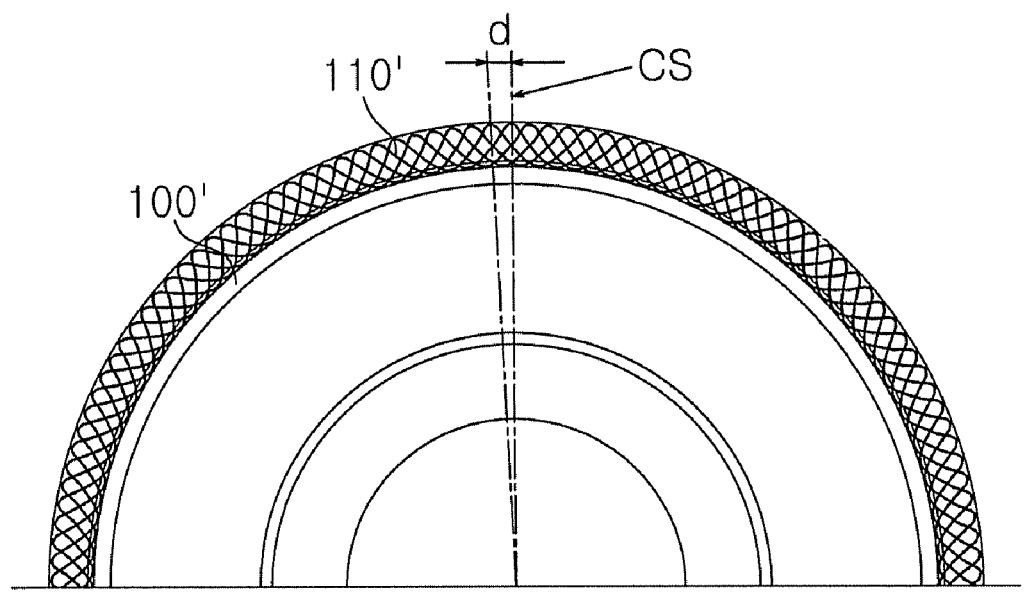
FIG. 11 is a lateral view of the pneumatic radial tire with water-splash control shown in FIG. 10.

FIG. 6 is a cross-sectional drawing of a different embodiment of a pneumatic radial tire with a ring-shaped water-splash control rib. FIG. 7 illustrates an enlarged cross-sectional drawing of FIG. 6. FIG. 8 is a solid figure of FIG. 6 and FIG. 9 is a lateral view of FIG. 6. FIG. 10 is a solid figure of another example of the pneumatic radial tire with water-splash control. FIG. 11 is a lateral view of the water-splash control tire of FIG. 10.

As shown in the drawings, the tire (1) consists of tread (TD), a sidewall (20), and belt layers composed of four belts under the tread (TD).

The sidewall (20) has a rib (100) that protrudes outward with drainage grooves (110) or drainage protuberances formed on the surface of the lateral side of the rib along the sidewall (20).

According to this embodiment, the rib protrudes laterally from a point of the sidewall (20) which on a line with the second belt from the belt layer (12). Alternatively, the rib can protrude from the point where there is an intersection between the continuation line of the average profile of the outmost belt and the lateral profile of the sidewall.

The preferred height (h) of the rib (100) is 0.085-0.115 times the width (TW) of the tread. If the height of the rib (100) is less than 0.085 times the width (TW) of the tread, it will be hard to effectively prevent the water splashing by compressing the tire against the surface of the wet road. On the other hand, if the height of the rib is greater than 0.115 times the width of the tread, there is an unnecessary cost in producing the rib.

The drainage grooves (110) or drainage protuberances are formed from the outer-end of the sidewall (20) to the lateral rib surface; the depth of the drainage groove is between 1 mm and 6 mm.

The depth (t) of the drainage groove (110) must satisfy the above condition. If the depth is less than 1 mm, the water drain is not as effective, but oppositely, if the depth is greater than 6 mm, the rib strength is decreased resulting in less effective water-splash control.

Preferably, the drainage groove (110) is in the center of the sidewall (20) and the range (d) between the adjacent drainage groove should be in the range of 0.5°-5° along the direction of the circumference of the tire from the continuation line (CS) connecting the center of the endpoint (20) of the sidewall and the center of the sidewall. The protrusion should be uniform for effective water drainage.

Another example of the rib (100') and drainage groove (110') are shown in FIG. 10 and FIG. 11. In these figures, the plurality of the drainage grooves (110') symmetrically crossover the continuation line (CS) which connects the sidewall's (20) endpoint and the center of rotation of the tire so that regardless of whether the tire rotates forward or backward, water is easily drained. In this situation, it is preferred that the range (d) between the adjacent drainage groove (110') or the drainage protuberance to be 0.5-5°.

Embodiment 3

Figure 12:
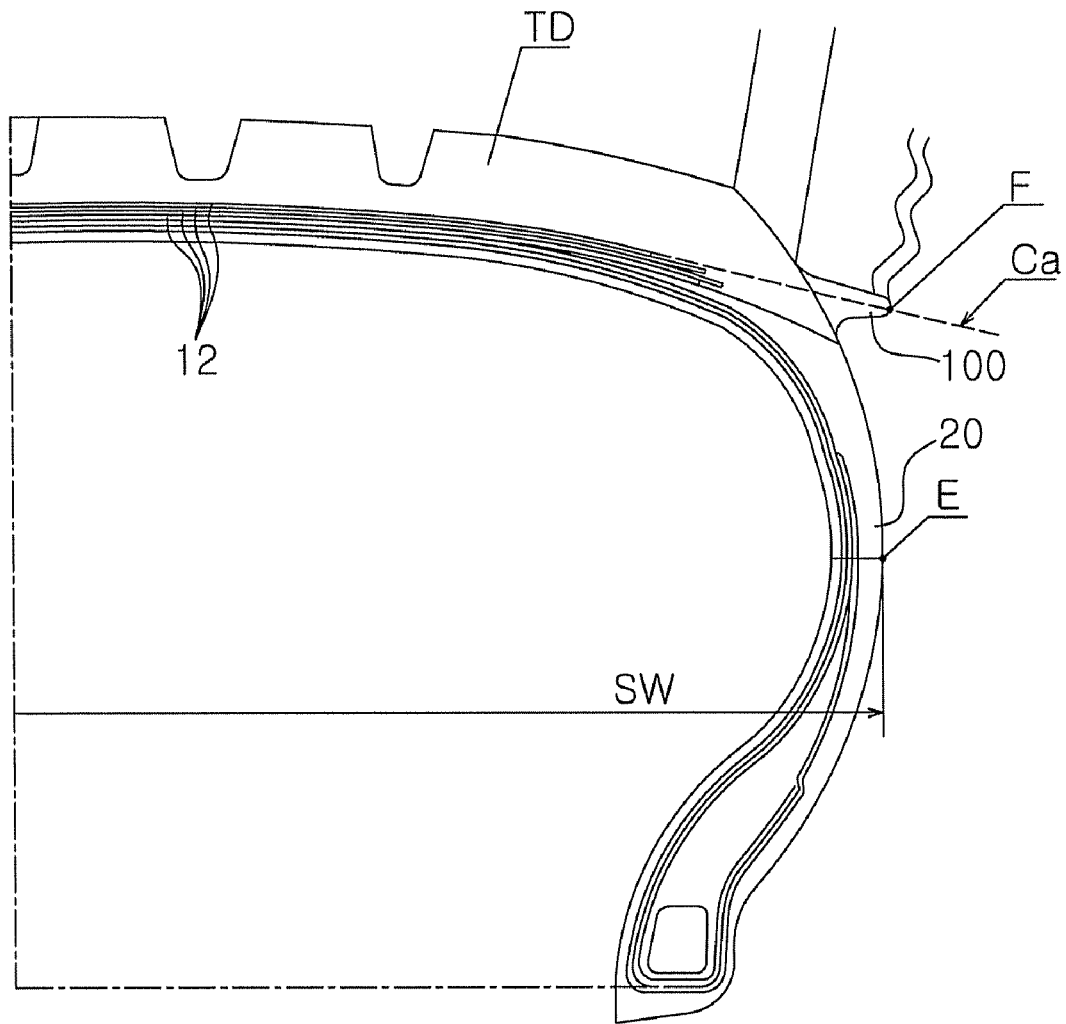
FIG. 12 is a suggestive cross-sectional view of an example of the present invention of the pneumatic radial tire with water-splash control.

FIG. 12 is another embodiment of the present invention which shows the cross-sectional view of a tire with water-splash control.

In a preferred aspect, the free end of the rib is contoured such that, when viewed looking down at the tread, forms a sine wave which allows for better drainage in the rib.

Embodiment 4

Figure 13:
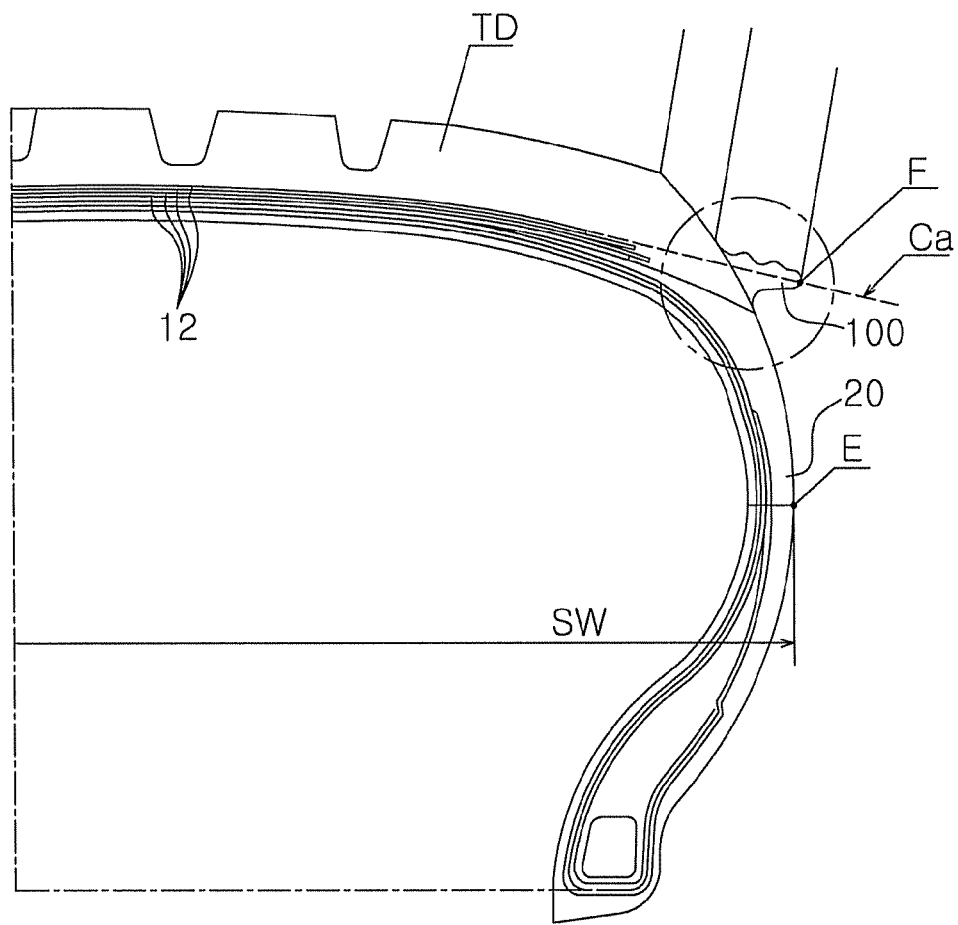
FIG. 13 is a suggestive cross-sectional view of an example of the present invention of the pneumatic radial tire with water-splash control.
Figure 14:
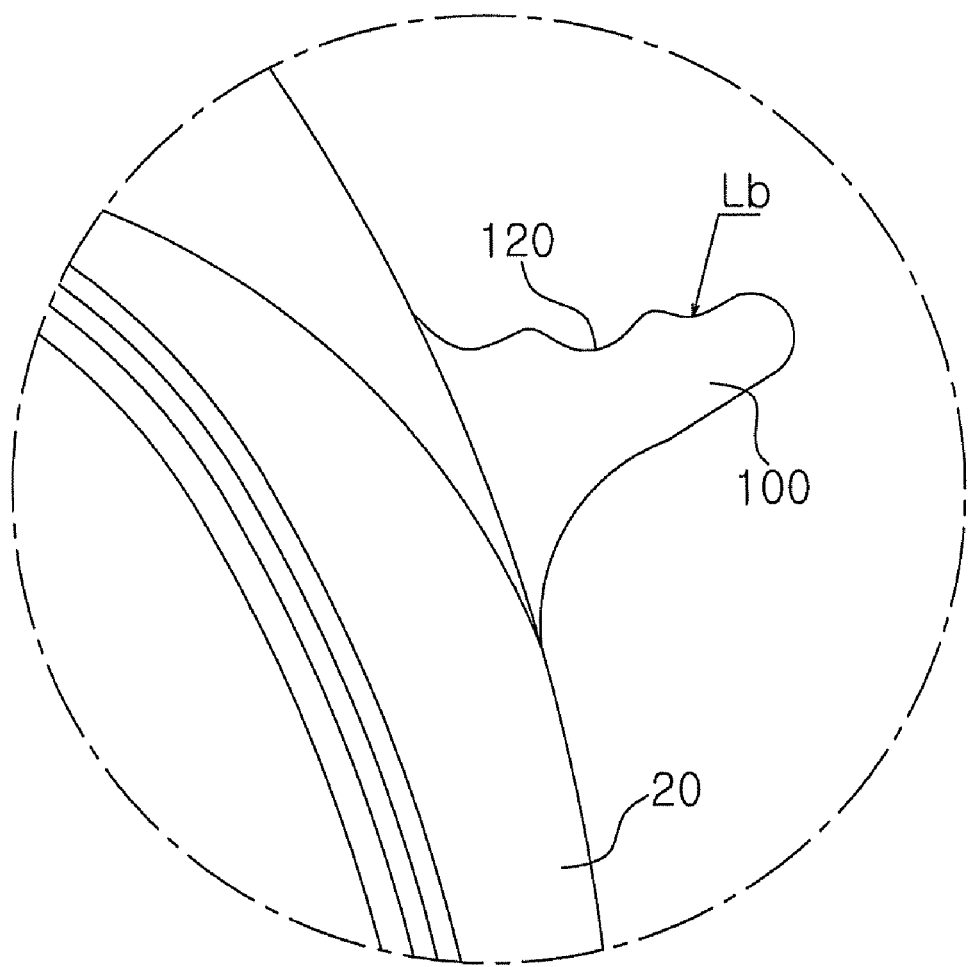
FIG. 14 is a partial enlarged view of FIG. 13.

FIG. 13 is another embodiment of the present invention which is a cross-sectional view of a tire with water-splash control. FIG. 14 is a partial enlargement of FIG. 13.

As shown in FIG. 13, the rib has at least one drainage channel (120) that goes along the circumference of the tire which is within the upper profile (Lb) of the rib.

According to this configuration, a portion of the water that is splashed from the surface of the road will drain backward with the drainage channel (120) along the circumference of the tire, and the remainder will follow the surface of the ring-shaped rib, resulting in a improved tire drainage.

It is to be understood that the foregoing describes preferred embodiments of the invention and that modifications may be made therein without departing from the spirit or scope of the invention as set forth in the claims. To particularly point out and distinctly claim the subject matter regarded as invention, the following claims conclude this specification.

What is claimed is:

1. A pneumatic radial tire with belt layers deposited under a tread and a ring-shaped water-splash control rib formed on each sidewall, wherein an upper profile of the rib is positioned above a continuation line which extends along an average profile of an outmost belt layer and which is divided into upper and lower profile of the outmost belt layer, and the height of the rib (h), which is the distance between the intersection point of the upper profile of the rib and the lateral profile of the sidewall to the farthest point of the rib from the center line of the tire, is 0.085-0.115 times the width of the tread ($0.085TW \leq h \leq 10.115TW$);

wherein the tire further comprises an interior angle A, which is an angle between a tangent line Le which passes through an endpoint (Pa) of the tread and which touches the upper profile and a horizontal line that is a horizontally continued line from the endpoint of the tread, and an interior angle D, which is an angle between a tangent line Ld which passes through the endpoint of the tread and which touches a lateral profile of the sidewall and the horizontal line, wherein A and D satisfy the following condition: $47° \leq A \leq D$; and wherein the tire further comprises a height SH, which is a maximum height of the tire from the horizontal axis of the tire, and a height Dp, which is a height from a starting point of the lower profile of the rib that touches the lower profile of the rib and the lateral profile of the sidewall to the horizontal axis, wherein SH and Dp satisfy the following condition: $0.74SH \leq Dp \leq 0.78SH$.

2. A pneumatic radial tire according to claim 1 further comprising, an interior angle C, which is an angle between the tangent line which passes through the endpoint of the tread and which touches the lateral profile of the sidewall and a vertical line which is the continuation line from the endpoint of the tread, and an interior angle B, which is an angle between the vertical line and the lateral profile of the tread, wherein B and C satisfy the following condition:

$$0° \leq B \leq C.$$

3. A pneumatic radial tire according to claim 2, wherein the rib comprises a recess section that has a uniform radius Rc including the starting point of the lower profile which is positioned under the continuation line.

4. A pneumatic radial tire according to claim 3 further comprising a radius Ra, which is a radius between a section of the lateral profile of the tread and a curved line connecting the upper profile of the rib, a radius Rd, which is a radius of an imaginary circle that passes through the endpoint of the tread connecting to the upper profile of the rib, the radius Rc and a radius Re, which is a radius of an imaginary circle whose diameter is a perpendicular line coming from the tangent line Le providing interior angle A to the starting point of the lower profile of the rib, wherein Ra, Rc, Rd, and Re satisfy the following condition:

$$2\ mm \leq Ra \leq Rd;\ and$$

$$3\ mm \leq Rc \leq Re.$$

5. A pneumatic radial tire according to claim 1, wherein the rib comprises drainage grooves or drainage protuberances in the upper profile of the rib.

6. A pneumatic radial tire according to claim 5, wherein the drainage grooves or the drainage protuberances are formed in a uniform range apart from each other on the upper profile of the rib.

7. A pneumatic radial tire according to claim 6, wherein the range is characterized in that, along the direction of the circumference of the tire from a continuation line CS which is a line connecting the endpoint of the sidewall and the center of rotation of the tire the range d is set to have an angle of 0.5°-5°.

8. A pneumatic radial tire according to claim 7, wherein a shape of the drainage groove or the drainage protuberance formed on the upper surface of the rib is S-shape or X-shape.

9. A pneumatic radial tire according to claim 8, wherein a height of the drainage protuberance is 1 mm-6 mm from the upper profile of the rib.

10. A pneumatic radial tire according to claim 1, wherein the upper profile of the rib comprises at least one channel that goes along the circumference of the tire.

11. A pneumatic radial tire according to claim 1, wherein a plane for a free end of the rib, viewed by looking down at the tread, comprises a sine wave configuration along the circumference of said tire.

12. A pneumatic radial tire according to claim 1, wherein a distance between the center line of the tire to an outmost point of the rib is greater than the distance between the center line to an outmost point of the sidewall in a condition where pressure and weight is applied to the tire.

13. A pneumatic radial tire according to claim 1, wherein the number of belt layers is either 2 or 4 belt layers.

* * * * *